April 26, 1960
H. ALLEN
2,934,313
GATE VALVE AND SEAT ASSEMBLY THEREFOR
Filed Feb. 4, 1957
2 Sheets-Sheet 2
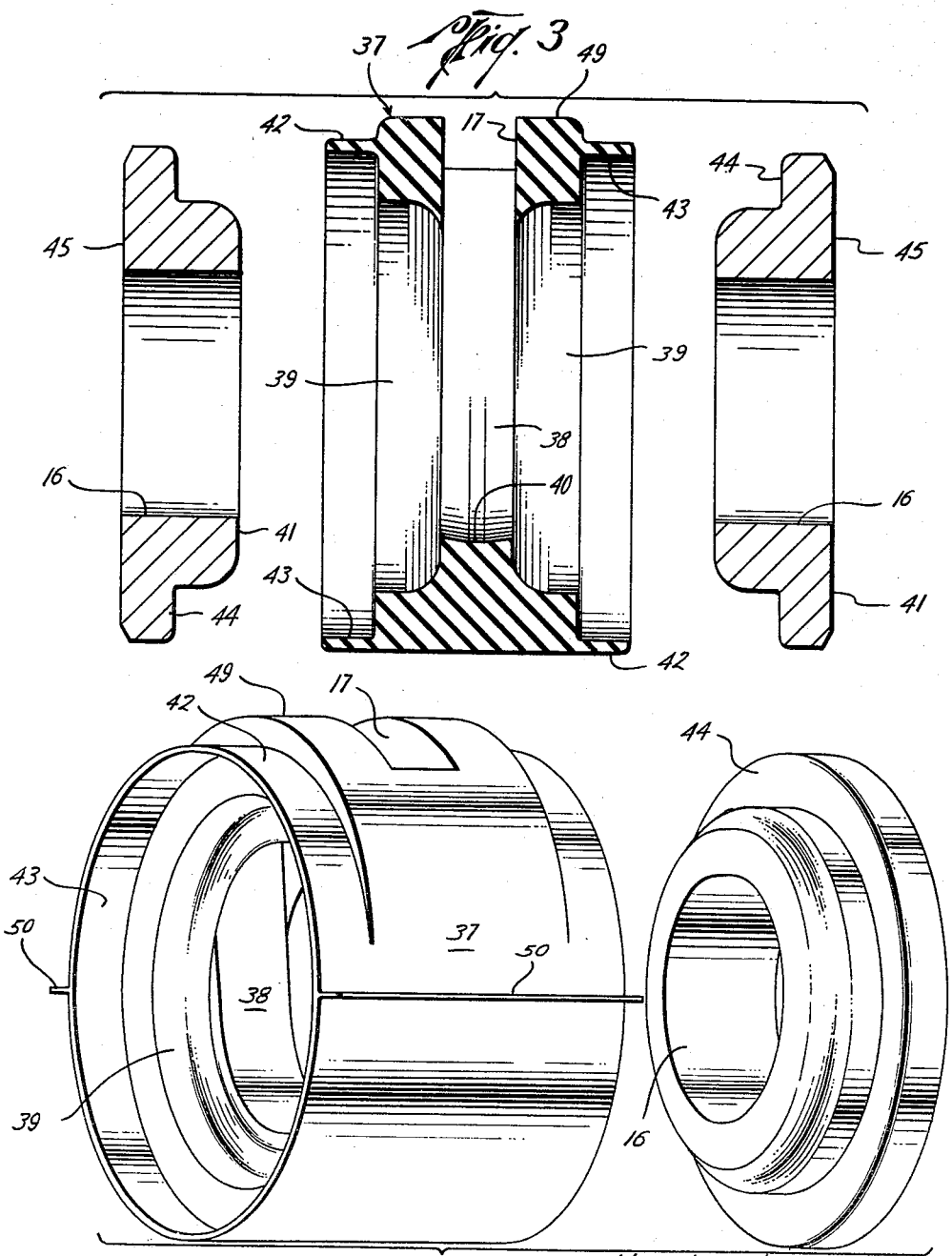
Herbert Allen
INVENTOR.
BY
Browning, Simms & Hyer
ATTORNEYS

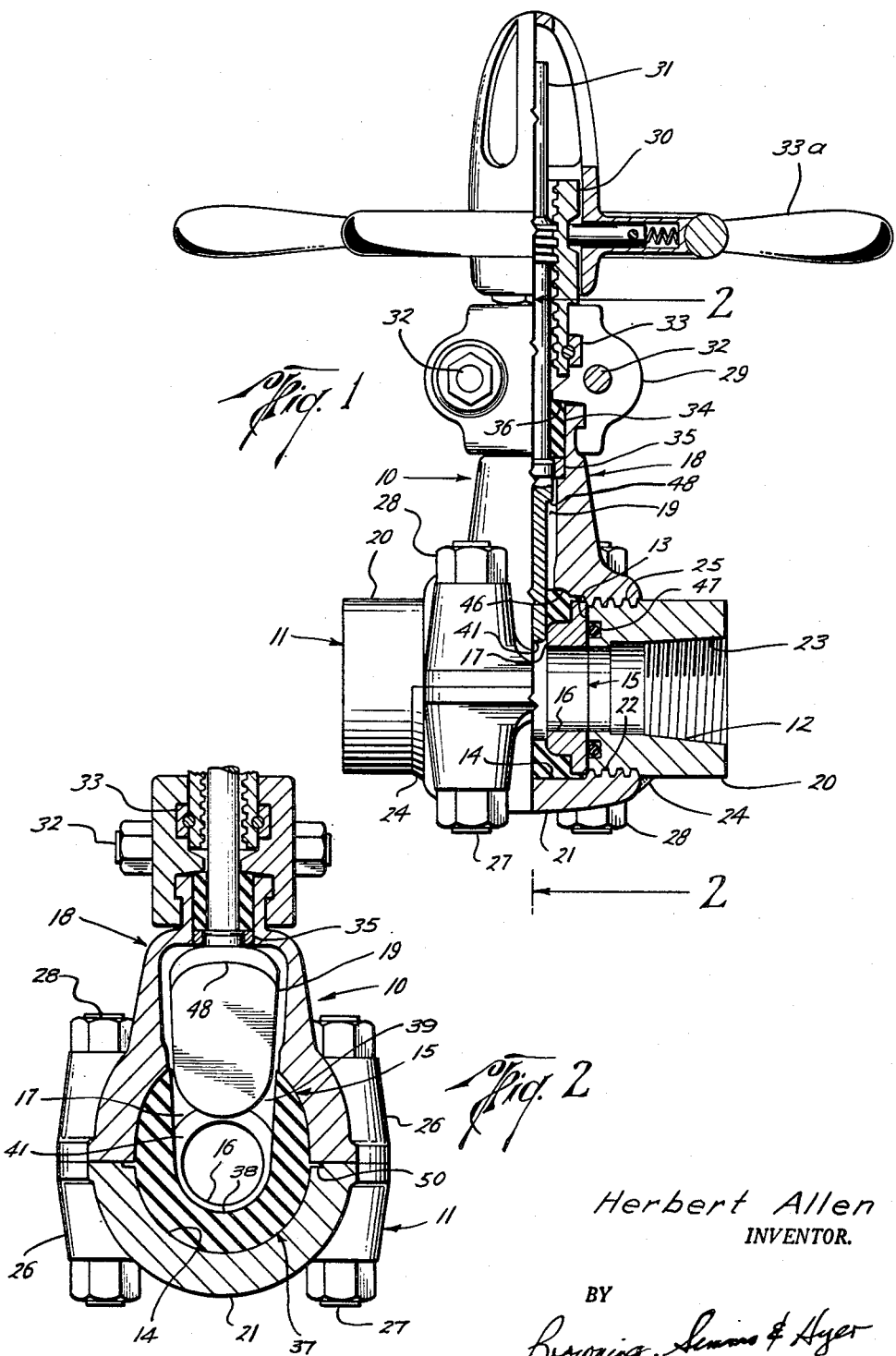

United States Patent Office 2,934,313
Patented Apr. 26, 1960

2,934,313

GATE VALVE AND SEAT ASSEMBLY THEREFOR

Herbert Allen, Houston, Tex., assignor to Cameron Iron Works, Inc., Houston, Tex.

Application February 4, 1957, Serial No. 637,909

5 Claims. (Cl. 251—328)

This invention relates to an improved gate valve and a novel replaceable seat assembly for use therewith.

A gate valve of the general type contemplated by the present invention is manufactured by the assignee of this application and is shown and described on pages 1114–1115 of the 1955–56 edition of the Composite Catalog of Oil Field and Pipeline Equipment. As can be seen from this publication, the valve includes a cap, a bonnet and a pair of hubs releasably connected to one another to form a flow passage therethrough. The inner ends of the hubs are spaced apart to provide an opening through which a gate supported by the bonnet may be moved for opening and closing the flow passage. A seat assembly is received between the inner ends of the hubs with a passageway therethrough aligned with the flow passage and a slot therein which intersects the passageway extending in the same direction as the opening so as to receive the gate for disposal across the passageway.

The seat assembly is formed in large part by an integral member of resilient material which includes a portion adapted to abut the lower end of the gate and additional annular portions at each side thereof adapted to be disposed between the opposite sides of the gate and the inner ends of the hubs. As the gate is moved to closed position and its lower end abuts the integral member of the seat assembly, the resilient material thereof is caused to flow. This material is confined by parts on the bonnet and gate as well as by metallic wear plates received within the annular portions of the integral member and forming the passageway through the seat assembly so that it forms a fluid tight seal about both sides of the gate. The valve is sealed against leakage when in the open position by means of outwardly extending lips on each of the annular portions of the seat assembly which are clamped tightly about the inner ends of the hubs between the cap and bonnet.

Although the seat assembly of this earlier valve is replaceable, its removal from between the hubs requires that the pipe connections with the hubs be broken. Obviously, this procedure is objectionable, and it is an object of the present invention to provide a gate valve of the general type so shown in which the seat assembly may be removed without breaking the pipe connections.

Another object is to provide such a gate valve as well as a seat assembly therefor which are so constructed as to permit usage of several of the parts of the earlier valve and its seat assembly.

Other objects, advantages and features of this invention will be apparent to one skilled in the art upon a consideration of the written specification, the attached claims and the annexed drawings.

In the drawings, wherein like reference characters are used throughout to designate like parts:

Fig. 1 is an elevational view, partly in section, of the gate valve of the present invention;

Fig. 2 is a sectional view of part of the valve, taken substantially along broken line 2—2 of Fig. 1;

Fig. 3 is an exploded sectional view of the seat assembly; and

Fig. 4 is an exploded perspective view of certain of the parts of the assembly.

Referring more particularly to the drawings, the gate valve shown in each of Figs. 1 and 2 is designated in its entirety by reference character 10, and includes a body 11 having a flow passage 12 therethrough and an opening 13 therein intersecting the flow passage 12 intermediate its ends. A cavity 14 is formed between the annular faces of the body surrounding the flow passage opposite the opening 13 in the body so as to receive a seat assembly 15 having a passageway 16 therethrough and a slot 17 therein intersecting the passageway intermediate its ends. A bonnet 18 removably connected to the body 11 across the opening 13 therein clamps the seat assembly within the cavity with the passageway 16 aligned with the flow passage 12 and the slot 17 extending in the same direction as the opening 13. Thus, a gate 19 supported by the bonnet may be moved through the slot and across the passageway for opening and closing the valve.

The valve body comprises a pair of hubs 20 having shoulders and grooves 22 on their inner ends interlocked about their lower half with complementary parts on a cap 21 identical in construction to the cap of the earlier valve so as to align the openings through the hubs to form the flow passage through the body. As can be seen from Fig. 1, the aforementioned annular faces are formed on the flat inner ends of the hubs, and the hubs and cap are secured in interlocking relation by means of a welding bead 24 about adjacent edges therebetween. Thus, upon removal of the bonnet 18 from the body, the seat assembly 13 may be replaced without disassembly of the parts of the body 11 and breaking of the pipe connections. Although the outer ends of the hubs are shown provided with internal threads 23 for connection in the pipeline, it is obvious that one or both of them may be flanged.

The bonnet 18 is also provided with shoulders and grooves 25 interlocked with the upper half of the complementary parts on the body subs 20, and is releasably connected in such interlocked relation by means of nuts 28 and bolts 27 received through abutting flanged portions 26 on the bonnet and cap. Obviously, upon release of this connection, the bonnet may be lifted from the body and the gate 19 removed from the slot 17 so as to permit replacement of the seat assembly.

Similarly to the earlier valve, the bonnet 18 includes a two-part clamp 29 at its upper end which supports a nut 30 having a threaded connection with a stem 31 on the upper end of the gate 19. More particularly, the clamp 29 is made up of a pair of substantially semi-cylindrical parts which are bolted together at 32 to engage a bearing assembly 33 about the nut 30. Thus, rotation of the nut 30 by means of handwheel 33a raises and lowers the stem of the gate.

A packing 34 of resilient material surrounding the stem of the gate is held between a flange on the clamp 29 and a ring 35 supported on an internal shoulder of the bonnet. When the gate is raised to the open position of Figs. 1 and 2, the lower end of the stem engages the packing 34 to cause it to seal about the stem. Grease may be supplied to the annular space within the bonnet above the packing 34 by a suitable Alemite fitting (not shown). Since, as previously mentioned, the several parts of the bonnet 18 may correspond to those of the earlier valve, further discussion thereof is thought unnecessary.

The novel seat assembly will be best seen in Figs. 3 and 4 to comprise an integral member 37 of suitable resilient material, such as rubber, molded into the shape described below. This resilient member 37 includes a porition 38 opposite the slot 17 in the assembly for abutting the lower end of the gate 19 when in closed position, and adidtional annular portions 39 on both sides of the slot. As can be seen from Fig. 3, the portion 38 is provided with a slight depression 40 for accommodating a centrally disposed bead-like portion 41 on the gate. Also, as can be seen from Fig. 2, the sides of the paddle of the gate and the slot 17 are tapered convergently downwardly and rounded along their lower ends.

The seat assembly 15 also includes a pair of relatively rigid rings 41 of metal or other material which is substantially harder than the resilient material of the member 37. Each of these rings is receivable within an annular portion 39 of the resilient member 37 to form the passageway 16 through the assembly at each side of the slot 17 therein. Each of the annular portions of the resilient member is provided with an outwardly extending lip 42 which surrounds a recess 43 formed therein, and each of the relatively rigid rings 41 is provided with an outwardly extending flange 44 thereon for fitting closely within the recess 43 of each annular portion of the resilient member. More particularly, the outer faces 45 of rings 41 are flat so as to abut with the flat inner ends of the hubs 20 of the body, and the lips 42 terminate inwardly of these faces to prevent damage thereto as the assembly is inserted in and removed from the cavity 14.

Referring now to Fig. 1, each side of the lower end of the bonnet 18 inwardly of the interlocking shoulders and grooves 25 is provided with a shoulder 46 engageable with the upper end of the annular portions 39 of the seat assembly when the bonnet is connected to the body so as to clamp the assembly in place and, more particularly, to tightly compress the lips about the flanges 44 of the rings 41. Also, the inner ends of the hubs 20 are provided with annular recesses for receving O-rings 47 sealable with the flat faces 45 on the outer ends of the relatively rigid rings 41. In this manner, the valve is sealed against leakage through the interlocking parts 25 when in an open position.

Similarly to the gate of the earlier valve, the gate 19 is provided with shoulders 48 on both sides thereof below the stem 31 for engagement with the upper ends of the annular portions 39 adjacent the bonnet shoulders 46. Thus, as the gate is moved to closed position, and its lower end engages the portion 38 of the resilient member, these shoulders 48 engage the upper ends of the annular portion 39 so as to confine the resilient material of the integral member 37 against flow. Thus, as previously described, closing of the gate will serve to form a seal thereabout.

As can be seen from Figs. 3 and 4, the upper end of each of the annular portions 39 of the seat assembly inwardly of the lips 42 is provided with a crown 49 so that the entire assembly is out-of-round and thus self-locating as it is moved into the semi-cylindrical cavity 14 in the valve body. Additionally, the integral resilient member 37 is provided with a longitudinally extending lip 50 on each side thereof which is adapted to be confined and thus seal between the abutting surfaces of the cap 21 and bonnet 18, as shown in Fig. 2.

As indicated in each of Figs. 3 and 4, each of the rings 41 is readily removable from within its corresponding annular portion 39 so that either or both portions may be replaced, as desired. It will be noted also that the unitary resilient member 37 corresponds to a similar member in the seat assembly of the earlier valve so as to enable the use of such parts in the seat assembly of the present invention, as well as to enable the use of the same mold in fabricating additional resilient members for the new seat assembly.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A gate valve, comprising a body having a flow passage therethrough and an opening therein intersecting the flow passage intermediate its ends to form a cavity opposite the opening in the body and between the annular faces of the body surrounding the flow passage, a seat assembly having a passageway therethrough and a slot therein intersecting the passageway intermediate its ends, said assembly being movable through said opening for disposal within the cavity with its passageway forming a continuation of the body flow passage and its slot extending in the same direction as the opening in the body, a bonnet removably connectable to the body across the opening therein, and a gate suported by the bonnet for movement through the slot in the seat assembly for opening and closing the passageway therethrough, said assembly including a resilient member having a portion opposite the slot therein for abutting the lower end of the gate and additional annular portions on both sides of said slot, a relatively rigid ring receivable within each annular portion of the resilient member to form the passageway through the assembly at each side of the slot therein, each of said annular portions having an annular lip which is clamped between the bonnet, body and one of said rings when said bonnet is connected to the body, and means sealing between said body and the outer face of each of said rings, said resilient member also having lips extending along the outside thereof longitudinally of the passageway through the seat assembly and sealably clamped between the body and bonnet from one annular lip to the other.

2. A gate valve of the character defined in claim 1, wherein said sealing means comprises O-rings received in recesses in opposite faces of the body cavity for sealing engagement with said outer faces of the rings.

3. A gate valve, comprising a body having a flow passage therethrough and an opening therein intersecting the flow passage intermediate its ends to form a cavity opposite the opening in the body and between the annular faces of the body surrounding the flow passage, a seat assembly having a passageway therethrough and a slot therein intersecting the passageway intermediate its ends, said assembly being movable through said opening for disposal within the cavity with its passageway forming a continuation of the body flow passage and its slot extending in the same direction as the opening in the body, a bonnet removably connectable to the body across the opening therein, and a gate supported by the bonnet for movement through the slot in the seat assembly for opening and closing the passageway therethrough, said assembly including a resilient member having a portion opposite the slot therein for abutting the lower end of the gate and additional annular portions on both sides of said slot, a relatively rigid ring receivable within each annular portion of the resilient member to form the passageway through the assembly at each side of the slot therein, said annular portions each having an outwardly extending annular lip thereon surrounding a recess therein, and said rings each having a flange thereon closely fittable within said recess, shoulders on said bonnet engageable with the upper ends of the annular portions of the seat assembly when the bonnet is connected to the body to clamp the lips between said shoulders, body and rings, shoulders on the gate engageable with said upper ends of the annular portions adjacent the bonnet shoulders, as the gate is moved to closed position, to confine flow of the resilient material of the member, and means sealing between the annular faces of said body and the outer face of each of said rings, said resilient member also having lips extending along the outside thereof longitudinally of the passageway through the seat assembly and sealably clamped between the body and bonnet from one annular lip to the other.

4. For use in a gate valve a substantially cylindrical seat assembly having a passageway therethrough and a slot therein intersecting the passageway intermediate its ends for receiving a gate thereacross, said assembly including a resilient member having a portion opposite the slot for abutting the lower end of the gate and additional annular portions at each side of said slot, each annular portion having an outwardly facing and concentrically arranged recess in the outer end thereof surrounded by an annular lip, said resilient member having lips extending along the outside thereof longitudinally of the passageway therethrough to connect the annular lips and a metal ring receivable within each annular portion of the resilient member to form the passageway at each side of the slot therein and having an outwardly extending annular flange thereon closely fittable with said recess, the outer face on each ring being substantially flat, and said annular lips terminating substantially flush with said outer faces.

5. A gate valve, comprising a body having a flow passage therethrough and an opening therein intersecting the flow passage intermediate its ends to form a cavity opposite the opening in the body and between the annular faces of the body surrounding the flow passage, a seat assembly having a passageway therethrough and a slot therein intersecting the passageway intermediate its ends, said assembly being movable through said opening for disposal within the cavity with its passageway forming a continuation of the body flow passage and its slot extending in the same direction as the opening in the body, a bonnet removably connectable to the body across the opening therein, and a gate supported by the bonnet for movement through the slot in the seat assembly for opening and closing the passageway therethrough, said assembly including a resilient member having a portion opposite the slot therein for abutting the lower end of the gate and additional annular portions on both sides of said slot, a relatively rigid ring receivable within each annular portion of the resilient member to form the passageway through the assembly at each side of the slot therein, said annular portions each having an outwardly extending annular lip thereon surrounding a recess therein, and said rings each having a flange thereon closely fittable within said recess, shoulders on said bonnet engageable with the upper ends of the annular portions of the seat assembly when the bonnet is connected to the body to clamp the lips between said shoulders, body and rings, and means sealing between the annular faces of said body and the outer face of each of said rings, said resilient member also having lips extending along the outside thereof longitudinally of the passageway through the seat assembly and sealably clamped between the body and bonnet from one annular lip to the other.

References Cited in the file of this patent

UNITED STATES PATENTS

| | | |
|---|---|---|
| 2,194,262 | Allen et al. | Mar. 19, 1940 |
| 2,731,231 | Garrott | Jan. 17, 1956 |
| 2,750,962 | Kreitchman et al. | June 19, 1956 |

FOREIGN PATENTS

| | | |
|---|---|---|
| 693,257 | Great Britain | June 24, 1953 |
| 749,932 | Great Britain | June 6, 1956 |

Disclaimer

2,934,313.—*Herbert Allen*, Houston, Tex. GATE VALVE AND SEAT ASSEMBLY THEREFOR. Patent dated Apr. 26, 1960. Disclaimer filed Apr. 12, 1972, by the assignee, *Cameron Iron Works, Inc.*

Hereby enters this disclaimer to all claims of said patent.

[*Official Gazette July 11, 1972.*]